United States Patent
He et al.

(10) Patent No.: US 8,561,416 B2
(45) Date of Patent: Oct. 22, 2013

(54) METHOD FOR THERMOELECTRIC ENERGY CONVERSION IN AN EXHAUST GAS RECIRCULATION SYSTEM

(75) Inventors: Xin He, Denver, CO (US); Alexander Knafl, Anacortes, WA (US); Russell P. Durrett, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 756 days.

(21) Appl. No.: 12/748,711

(22) Filed: Mar. 29, 2010

(65) Prior Publication Data

US 2011/0232301 A1     Sep. 29, 2011

(51) Int. Cl.
*F25B 21/02* (2006.01)
*B60H 1/00* (2006.01)
*F01N 5/02* (2006.01)
*F28G 1/12* (2006.01)
*F28D 7/02* (2006.01)
*F28F 7/00* (2006.01)
*F02C 3/00* (2006.01)
*F01N 3/02* (2006.01)
*F02P 5/00* (2006.01)

(52) U.S. Cl.
USPC ........... 62/3.61; 165/104.14; 165/41; 165/51; 165/52; 165/95; 165/164; 165/185; 62/3.2; 62/3.3; 62/3.4; 62/3.5; 62/3.6; 62/3.7; 60/320; 60/39.01; 123/406.48; 123/568.29

(58) Field of Classification Search
USPC ............ 165/104.14, 41, 51, 52, 95, 164, 185, 165/3.2–3.7; 60/320, 39, 52; 123/568.12, 123/406.48, 568.11–568.29; 62/3.2–3.7
See application file for complete search history.

(56) References Cited

U.S. PATENT DOCUMENTS

| | | | |
|---|---|---|---|
| 5,195,476 A * | 3/1993 | Schwarz | 123/179.5 |
| 2002/0038550 A1* | 4/2002 | Gillen | 62/3.7 |
| 2005/0072142 A1* | 4/2005 | Sasaki et al. | 60/300 |
| 2006/0196484 A1* | 9/2006 | Gill et al. | 123/549 |
| 2007/0234739 A1* | 10/2007 | Delaloye et al. | 60/786 |
| 2009/0071524 A1* | 3/2009 | Son | 136/203 |
| 2009/0322272 A1* | 12/2009 | Ozawa et al. | 318/473 |

FOREIGN PATENT DOCUMENTS

| | | | |
|---|---|---|---|
| CN | 1441154 A | | 9/2003 |
| DE | 10 2006 019 282 A1 | | 10/2007 |
| DE | 10 2007 051 164 A1 | | 5/2008 |
| FR | 2880074 A1 | * | 6/2006 |
| JP | 2000 213426 A | | 8/2000 |
| JP | 2009156169 A | * | 7/2009 |

OTHER PUBLICATIONS

DOE Presentation. "BSST Waste Heat Recovery Program" Feb. 27, 2008.

\* cited by examiner

*Primary Examiner* — Frantz Jules
*Assistant Examiner* — Erik Mendoza-Wilkenfel

(57) ABSTRACT

A method for managing thermal energy in an internal combustion engine including an exhaust gas recirculation system and an engine cooling system includes recirculating a portion of an exhaust gas through the exhaust gas recirculation system that is in thermal communication with a first side of a thermoelectric device, flowing an engine coolant into thermal communication with a second side of a thermoelectric device, and controlling electric current between an electrical energy storage device and the thermoelectric device to transfer thermal energy between the recirculated exhaust gas and the engine coolant.

17 Claims, 3 Drawing Sheets

METHOD FOR THERMOELECTRIC ENERGY CONVERSION IN AN EXHAUST GAS RECIRCULATION SYSTEM

TECHNICAL FIELD

This disclosure is related to exhaust gas recirculation systems in internal combustion engine applications.

BACKGROUND

The statements in this section merely provide background information related to the present disclosure and may not constitute prior art.

Internal combustion engines combust air/fuel charges in combustion chambers to generate work. Combustion of an air/fuel charge is dependent upon the temperature and pressure conditions existing within the combustion chamber. Variations in temperature and pressure within the combustion chamber affect combustion and associated work and emissions that are generated thereby.

Exhaust gas recirculation (EGR) systems recirculate exhaust gas into an intake system to mix with the air/fuel charge and affect combustion. This includes reducing combustion temperature, thus reducing generation of NOx species and emissions. EGR systems are used in different engine types and configurations, including both compression-ignition and spark-ignition engine systems.

The temperature of the recirculated exhaust gas affects the temperature of the air/fuel charge within the combustion chamber. Known EGR systems may include a heat exchange device in the EGR system to modulate the temperature of recirculated exhaust gas, and thus modulate the temperature of the air/fuel charge. Known EGR heat exchange devices can remove heat and thereby reduce temperature of the recirculated exhaust gas. Known heat exchange devices conductively transfer thermal energy between the recirculated exhaust gas and a coolant, and/or radiantly dissipate thermal energy through physical devices, e.g., fins exposed to ambient air. Heat energy thus transferred may be lost.

SUMMARY

A method for managing thermal energy in an internal combustion engine including an exhaust gas recirculation system and an engine cooling system includes recirculating a portion of an exhaust gas through the exhaust gas recirculation system that is in thermal communication with a first side of a thermoelectric device, flowing an engine coolant into thermal communication with a second side of a thermoelectric device, and controlling electric current between an electrical energy storage device and the thermoelectric device to transfer thermal energy between the recirculated exhaust gas and the engine coolant.

BRIEF DESCRIPTION OF THE DRAWINGS

One or more embodiments will now be described, by way of example, with reference to the accompanying drawings, in which.

DETAILED DESCRIPTION

Figure 1:
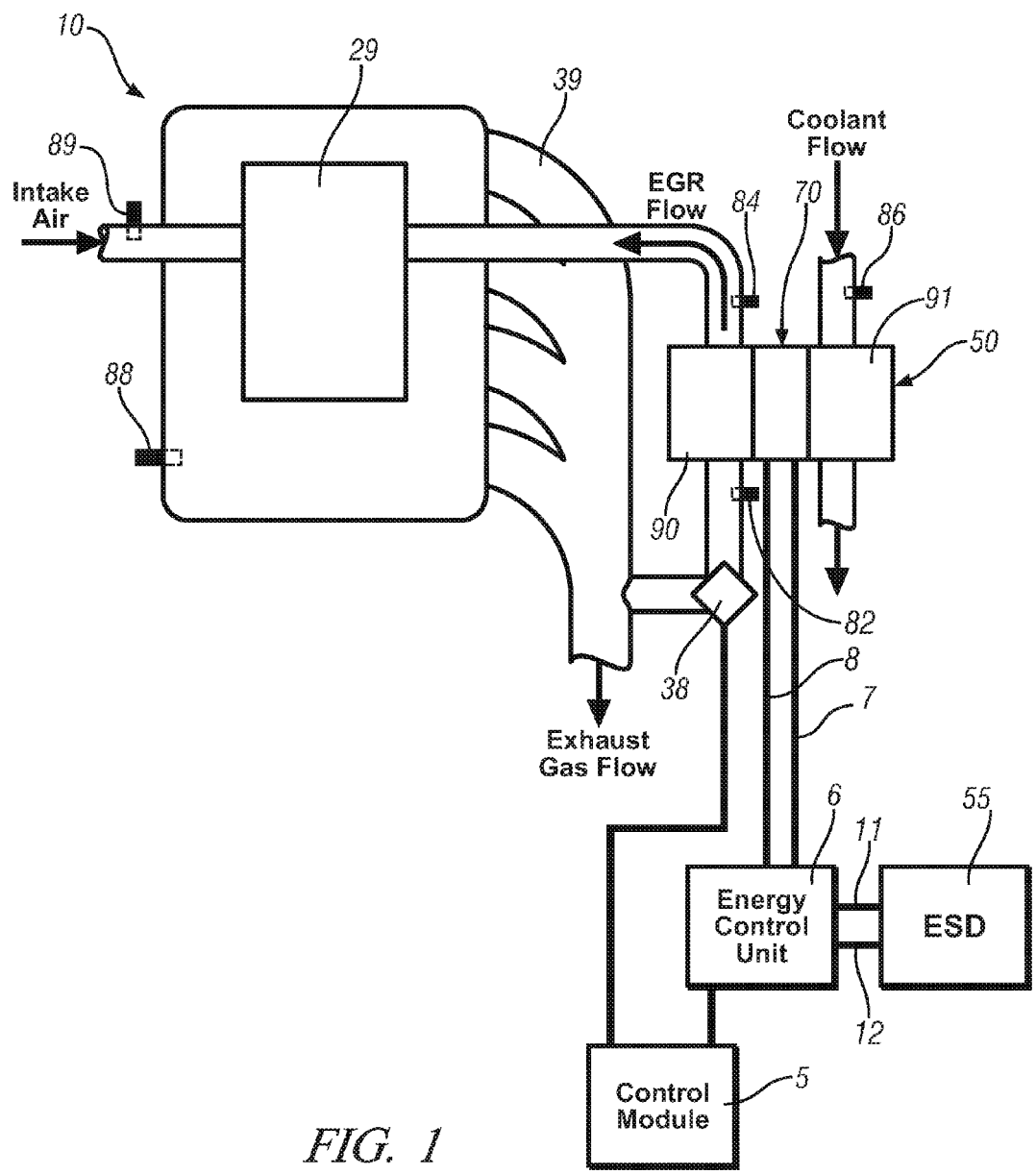
FIG. 1 schematically illustrates an exemplary engine configuration including a control module, an electrical storage device, and an exhaust gas recirculation system including a thermoelectric heat exchanger, in accordance with the present disclosure.

Referring now to the drawings, wherein the showings are for the purpose of illustrating certain exemplary embodiments only and not for the purpose of limiting the same, FIG. 1 schematically illustrates an exemplary engine configuration including an engine 10 and an accompanying control module 5, an energy control unit 6 (e.g. controllable DC to DC converter), an electrical energy storage device 55, and an exhaust gas recirculation system fluidly coupled to a thermoelectric heat exchanger 50, that have been constructed in accordance with an embodiment of the disclosure.

The exemplary engine 10 is selectively operative in a plurality of combustion modes and air/fuel ratios including an air/fuel ratio that is primarily lean of stoichiometry. The disclosure can be applied to various internal combustion engine systems and combustion cycles and is not limited thereby.

In one embodiment the engine 10 can be coupled to an electro-mechanical hybrid powertrain system. The electro-mechanical hybrid powertrain system can include non-fuel torque machines configured to transfer tractive power to a driveline of a vehicle.

The exemplary engine 10 can include any known engine configuration including a multi-cylinder direct-injection four-stroke internal combustion engine. An air intake system 29 provides intake air to an intake manifold which directs and distributes air into intake runners of the combustion chambers. The air intake system 29 includes airflow ductwork and devices for monitoring and controlling the airflow. The exhaust gas recirculation system including an external flow passage configured to recirculate exhaust gases from an engine exhaust system 39 to the air intake system 29, including a flow control valve referred to as an exhaust gas recirculation (EGR) valve 38. The control module 5 includes a control scheme to control mass flow of exhaust gas to the air intake system 29 by controlling opening of the EGR valve 38.

The EGR valve 38 is used to control flow of the recirculated exhaust gas through the thermoelectric heat exchanger 50. When controlled to a closed position, the EGR valve 38 blocks any exhaust gas flow from the exhaust system 39 from entering the external flow passage 90. When controlled to an open position, recirculated exhaust gas flows through the external flow passage 90 to the air intake system 29. In one embodiment, the EGR valve 38 may be controlled to various partial open and closed positions, thereby varying mass flow of recirculated exhaust gas flow through the external flow passage 90.

The engine 10 is equipped with various sensing devices for monitoring engine operation, including a first and second temperature devices 82 and 84 for monitoring temperature of the recirculated exhaust gas flow before and after the thermoelectric heat exchanger 50, respectively, a third temperature device 86 for monitoring coolant temperature into the thermoelectric heat exchanger 50, a fourth temperature device 88 for monitoring oil temperature within the engine 10, and a fifth temperature device 89 for monitoring intake air temperature into the engine 10.

The control module 5 executes algorithmic code stored therein to control actuators to control engine operation, including the intake air system 29, throttle position, spark timing, fuel injection mass and timing, intake and/or exhaust valve timing and phasing, and the EGR valve 38. Valve timing and phasing may include negative valve overlap and lift of exhaust valve reopening (in an exhaust re-breathing strategy)

in one embodiment. The control module 5 is configured to receive input signals from an operator (e.g., a throttle pedal position and a brake pedal position) to determine an operator torque request and inputs from the sensors indicating the engine speed and intake air temperature, and coolant temperature and other ambient conditions. The control module 5 can operate to turn the engine 10 on and off during ongoing vehicle operation, and can operate to selectively deactivate a portion of the combustion chambers or a portion of the intake and exhaust valves through control of fuel and spark and valve deactivation. The control module 5 can control air/fuel ratio based upon feedback from an exhaust gas sensor.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The energy control unit 6 is electrically connected to the electrical energy storage device 55, the control module 5, and the thermoelectric heat exchanger 50. The energy control unit 6 controls the flow of electric current from the electrical energy storage device 55 to the thermoelectric heat exchanger 50. The energy control unit 6 includes electronics devices and control modules configured to receive commands from the control module 5 to supply electrical power to the thermoelectric heat exchanger 50. The electronics devices regulate and otherwise control electric power transmitted between the thermoelectric heat exchanger 50 and the electrical energy storage device 55.

Electric current can flow between the electrical energy storage device 55 and the energy control unit 6. The energy control unit 6 transmits electric current to and from the thermoelectric heat exchanger 50 via electrical cables 7 and 8, and the energy control unit 6 similarly transmits electric current to and from the electrical energy storage device 55 via electrical cables 11 and 12. Electric current may be transmitted to and from the electrical energy storage device 55 in accordance with whether the electrical energy storage device 55 is being charged or discharged.

The electrical energy storage device 55 is configured to supply energy to the thermoelectric heat exchanger 50 via the energy control unit 6. The electrical energy storage device 55 is electrically connected to the energy control unit 6. The electrical energy storage device 55 can include any electrical energy storage device(s) known in the art including electrical batteries, and/or capacitor system, and is configured to store electric power generated by the thermoelectric heat exchanger 50.

The thermoelectric heat exchanger 50 is electrically connected to the energy control unit 6. The thermoelectric heat exchanger 50 is fluidly connected to an engine coolant system via a coolant flow passage 91 configured to flow coolant through the thermoelectric heat exchanger 50. The thermoelectric heat exchanger 50 is fluidly connected to the air intake system 29 and the exhaust system 39 via the external flow passage 90. The thermoelectric heat exchanger 50 is in thermal contact, i.e., configured to propagate thermal energy, with the recirculated exhaust gas and configured to transfer thermal energy to and from the recirculated exhaust gas. The thermoelectric heat exchanger 50 is in thermal contact with the coolant and configured to transfer thermal energy to and from the coolant.

The thermoelectric heat exchanger 50 includes a plurality of thermoelectric devices, e.g., a thermopile, represented as a thermoelectric semiconductor layer 70 in FIG. 1. The thermoelectric devices generate an electromotive force (emf) in response to a thermal differential defined as the Seebeck effect. The electromotive force produces an electric potential across the thermoelectric devices. The thermoelectric devices can convert thermal energy from the recirculated exhaust gas feedstream to electrical energy and can transfer heat to and from the recirculated exhaust gas feedstream using electric energy. As used herein, the term "thermoelectric device" includes any type of device which is capable of using a thermal differential to generate an electromotive force without mechanical motion. Examples include any of several classes of materials or devices such as bulk materials (e.g., PbTe, $Bi_2Te$, Skutterudites), thin film devices (e.g., quantum well devices, superlattices), segmented couples (JPL), combining materials, and thermal diodes. In one embodiment, p-type and n-type semiconductor elements are electrically connected by conductive material.

The thermoelectric devices are configured to transfer thermal energy between opposing first and second side of the thermoelectric devices when electric current flows through the thermoelectric devices. When electric current flows through the thermoelectric heat exchanger 50, the plurality of thermoelectric devices may cause either heating or cooling depending on a polarity of an electric potential created by the electric current flow. In one embodiment, thermal energy transfers from a top side to a bottom side when electric current flows in a first direction. Reversing the electric current flow reverses the polarity of an electric potential and thus the flow of the thermal energy, e.g., from the bottom side to the top side.

Figure 2:
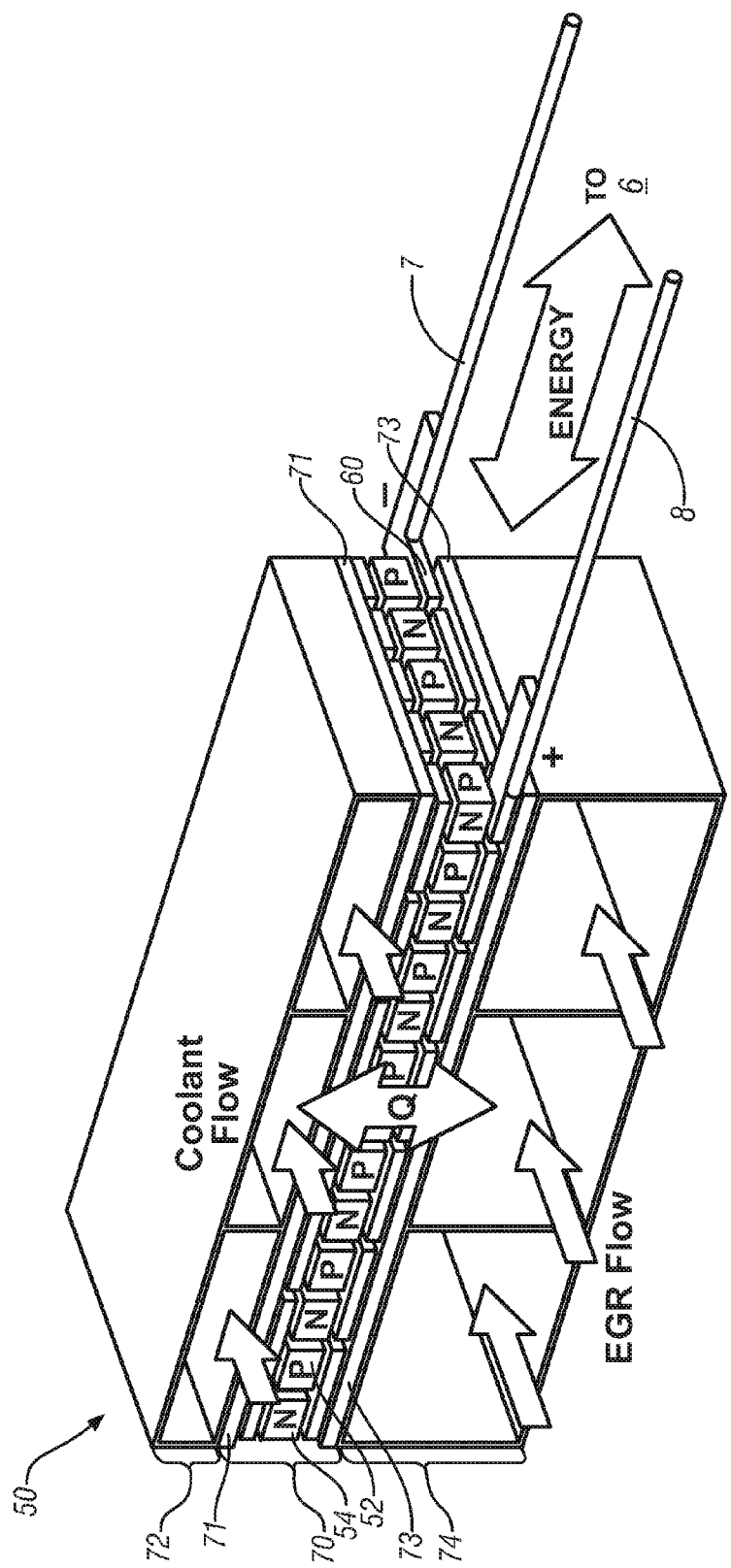
FIG. 2 is a sectional view of the thermoelectric heat exchanger, in accordance with the present disclosure.

FIG. 2 is a sectional view of an exemplary thermoelectric heat exchanger 50. The thermoelectric heat exchanger 50 includes the thermoelectric semiconductor layer 70 having opposing sides, a coolant flow layer 72 in thermal communication with one opposing side of the semiconductor layer 70, and an EGR flow layer 74 in thermal communication with the other opposing side of the semiconductor layer 70. The coolant flow layer 72 is fluidly connected with the coolant flow passage 91 and configured to transfer thermal energy between the thermoelectric semiconductor layer 70 and the coolant. The EGR flow layer 74 is fluidly connected to the EGR passage 90 and configured to transfer thermal energy between the thermoelectric semiconductor layer 70 and the recirculated exhaust gas feedstream.

The thermoelectric semiconductor layer 70 includes p-type and n-type semiconductor elements, i.e., thermoelectric devices 52 and 54 electrically connected alternatively in series to form p-n junctions. Preferably, the p-type and n-type semiconductor elements 52 and 54 are porous and are deaerated into a vacuum. The p-type and n-type semiconductor elements 52 and 54 are electrically connected by a conductive material 60 formed on both end surfaces thereof and side surfaces thereof being covered with an insulation material. The p-type and n-type semiconductor elements 52 and 54 are electrically connected alternatively in series throughout the thermoelectric semiconductor layer 70. In one embodiment, insulation material covers an outer surface of the assembly not covered by the conductive material that electrically connects the p-type and n-type semiconductor elements 52 and 54 preferably in a manner that thermally connects a first side 71 of the thermoelectric semiconductor layer 70 to the coolant flow layer 72 and a second side 73 of the thermoelectric semiconductor layer 70 to the EGR flow layer 74.

An electric potential is created across the thermoelectric semiconductor layer 70 when the relatively hotter recirculated exhaust gas feedstream flows through the EGR flow layer 74 and when the relatively cooler coolant flows through the coolant flow layer 72. The magnitude of the electric potential is defined by physical characteristics of the thermoelectric semiconductor layer 70 and magnitude of the temperature differential between sides of the thermoelectric semiconductor layer 70. Polarity of the electric potential is defined based upon which side of the thermoelectric semiconductor layer 70 is relatively hotter. When an electrical load, e.g., a battery, is attached across the electric potential, electrical energy flows from a hotter side of the thermoelectric semiconductor layer 70 to the load.

When electric current is supplied to the thermoelectric semiconductor layer 70, thermal energy is transferred and removed from either the coolant or the recirculated exhaust gas feedstream depending on a polarity of the electric potential created by the direction of the electric current flow. As described hereinabove, electric current may be supplied using the electric energy storage device 55. When electric current is supplied to the thermoelectric semiconductor layer 70, an electric potential is created, thereby promoting a thermal energy transfer between the coolant and the recirculated exhaust gas feedstream. For example, when electric current flows in a first direction through the thermoelectric heat exchanger 50 thermal energy is removed from the coolant and transferred to the recirculated exhaust gas feedstream. When electric current flows in an opposite direction through the thermoelectric heat exchanger 50, thermal energy is removed from the recirculated exhaust gas feedstream and transferred to the coolant.

Figure 3:
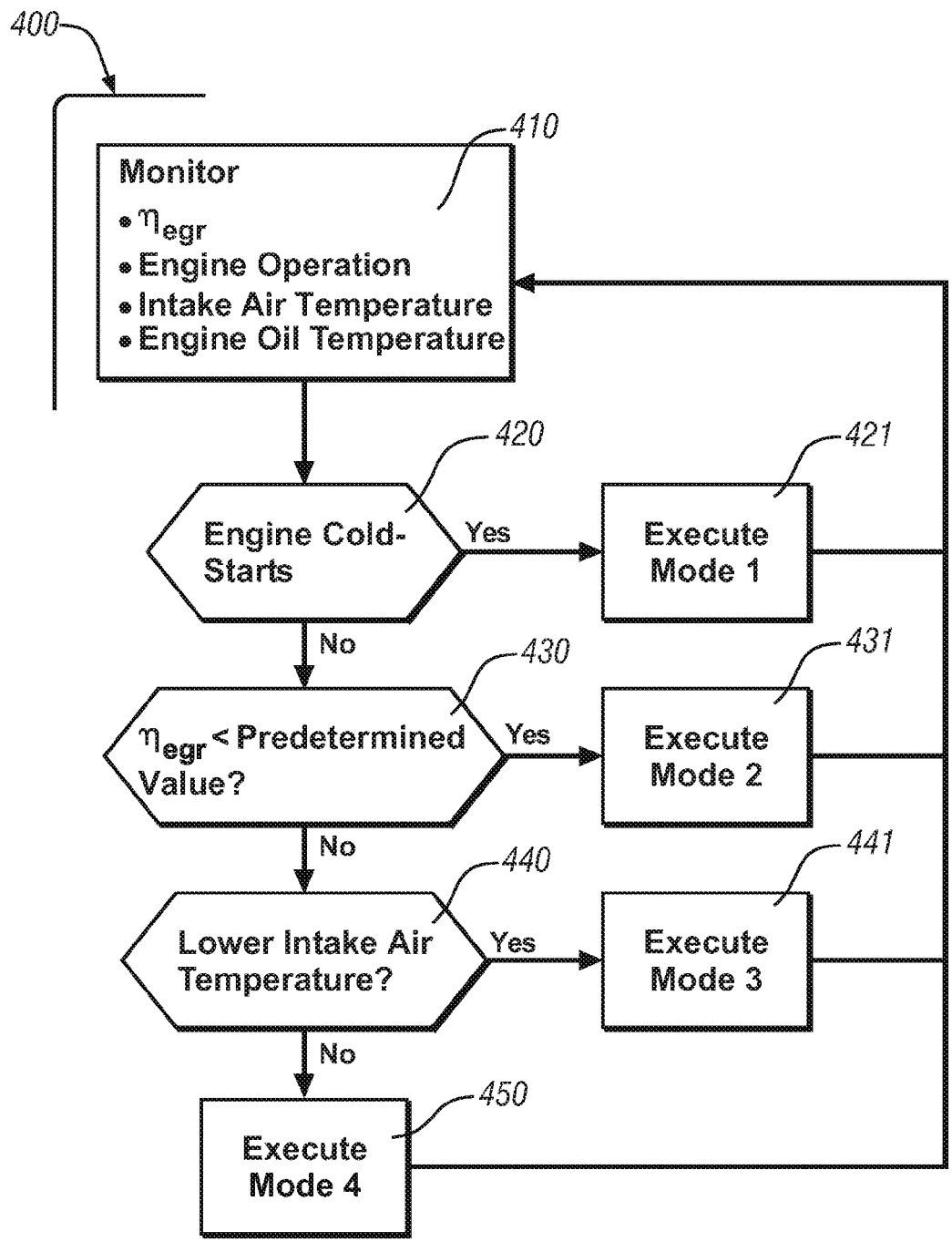
FIG. 3 is an exemplary control scheme, in accordance with the present disclosure.

FIG. 3 is an exemplary control scheme 400 for operating the engine 10 and using the thermoelectric heat exchanger 50. The control scheme 400 is illustrated in FIG. 3, and described herein as including discrete elements. Such illustration is for ease of description and it should be recognized that the functions performed by these elements may be combined in one or more devices, e.g., implemented in software, hardware, and/or application-specific integrated circuitry. For example, the control scheme 400 may be executed as one or more algorithms in the control module 5. The control scheme 400 includes monitoring the temperature of the recirculated exhaust gas flow into the thermoelectric heat exchanger 50, ($T_{EGR\_IN}$), using the first temperature device 82 and out of the thermoelectric heat exchanger 50, ($T_{EGR\_OUT}$), using the second temperature device 84, and monitoring the temperature of the coolant flowing into the thermoelectric heat exchanger 50, ($T_{Coolant\_In}$) using the third temperature device 86 (410).

The oil temperature and intake air temperature are monitored to determine whether a cold-start has been executed on the engine 10 using the fourth and fifth temperature devices 88 and 89, respectively (420). If a cold start has been executed, the control module 5 commands a first operating mode (421). If a cold-start has not been executed, the control module 5 determines whether cooling efficiency of the thermoelectric device ($\eta_{egr}$) of the thermoelectric device is less than a predetermined value (430). If the cooling efficiency of the thermoelectric device value is less than the predetermined value the control module 5 commands a second operating mode (431). If the cooling efficiency of the thermoelectric device value is not less than the predetermined value, the control module 5 determines whether a lower intake air temperature is desired based upon known characteristics of combustion and speed/load requirements of the engine 10 (440). When a lower intake air charge temperature is desired, the control module 5 commands a third operating mode (441). If the recirculated exhaust gas feedstream does not need to be heated or cooled by the thermoelectric heat exchanger 50, the control module 5 commands a fourth operating mode (450).

The first operating mode (421) includes operating the thermoelectric heat exchanger 50 to heat the engine 10 subsequent to a cold-start. One of multiple methods may be used to determine whether a cold-start has been executed on the engine 10 by monitoring engine operation (420). In one embodiment, a cold-start is defined as an engine start whereat at least one of the intake air temperature is less than a first predetermined temperature and the engine oil temperature is less than a second predetermined temperature. In a second embodiment, a cold-start is defined as an engine start occurring subsequent to the engine 10 operating for a predetermined time period in an engine-off operating state. For example, when the engine 10 is in an engine-off operating state for a predetermined time period, a subsequent engine start is designated as an engine cold-start.

The first operating mode (421) includes transferring electrical energy to the thermoelectric heat exchanger 50 to heat the engine 10 subsequent to an engine cold-start. The energy control unit 6 transfers energy from the electrical energy storage device 55 to the thermoelectric heat exchanger 50 to heat the recirculated exhaust gas feedstream. The recirculated exhaust gas feedstream subsequently transfers thermal energy to the engine 10. The heating is preferably initiated after a predetermined time period elapses subsequent to an engine start, e.g., 30 seconds. The heat transferred from the recirculated exhaust gas feedstream accelerates engine warm-up and thereby reduces engine out emissions, e.g., hydrocarbons and carbon monoxide.

The second operating mode (431) includes operating the thermoelectric heat exchanger 50 to reduce combustion by-product deposit build-up within the thermoelectric heat exchanger 50. The recirculated exhaust gas feedstream contains by-products of combustion including particulate matter (PM) and other combustion by-products. Passages within the thermoelectric heat exchanger 50 can act as filters to the combustion by-products, collecting particulate deposits on the surfaces within the passages. The particulate deposits can cause adverse effects within the thermoelectric heat exchanger 50 including corrosion, increased flow resistance, flow blockage, reduction of heat transfer capacity, noise and/or vibrations. Combustion by-product deposit build-up is reduced by using the thermoelectric heat exchanger 50 to heat the recirculated exhaust gas feedstream to a predetermined temperature, e.g., 600° C. Heating the recirculated exhaust gas feedstream to a predetermined temperature burns the combustion by-product deposit build-up within the thermoelectric heat exchanger 50, thereby reducing fouling in the thermoelectric heat exchanger 50. Preferably, the predetermined temperature is sufficiently high to compensate for an uneven distribution of heat that may exist within the thermoelectric heat exchanger 50.

The second operating mode is executed when cooling efficiency of the thermoelectric device ($\eta_{egr}$) is less than a predetermined value (430). Cooling efficiency of the thermoelectric device is determined based upon the temperature of the recirculated exhaust gas flow into the thermoelectric heat exchanger 50, ($T_{EGR\_IN}$), the temperature of the recirculated exhaust gas flow out of the thermoelectric heat exchanger 50, ($T_{EGR\_OUT}$), and the temperature of the coolant flowing into the thermoelectric heat exchanger 50, ($T_{Coolant\_In}$). Cooling efficiency of the thermoelectric device ($\eta_{egr}$) can be determined using the following equation:

$$\eta_{EGR} = \frac{(T_{EGR\_in} - T_{EGR\_out})}{(T_{EGR\_in} - T_{Coolant\_in})} \times 100\% \quad [1]$$

The second operating mode (431) includes heating the recirculated exhaust gas feedstream to a predetermined temperature by supplying electrical energy from the electrical energy storage device 55 to the thermoelectric heat exchanger 50. The energy control unit 6 supplies electric current from the electrical energy storage device 55 to effect a thermal energy transfer from the coolant to the recirculated exhaust gas feedstream, thereby increasing temperature of the recirculated exhaust gas feedstream. The increased temperature of the recirculated exhaust gas feedstream within the thermoelectric heat exchanger 50 burns the deposited combustion by-product.

The third operating mode (441) includes operating the thermoelectric heat exchanger 50 to remove thermal energy from the recirculated exhaust gas feedstream to lower combustion temperatures. The control module 5 executes the third operating mode subsequent to determining a preferential intake air temperature can be achieved by lowering recirculated exhaust gas temperature (440). A preferred intake air temperature is determined using engine control algorithms calibrated for a particular hardware application. The methods for determining a preferred intake air temperature are well known in the art and are outside the scope of this application.

The third operating mode (441) includes supplying electrical energy to the thermoelectric heat exchanger 50. The energy control unit 6 supplies electric current from the electrical energy storage device 55 to effect a thermal energy transfer from the recirculated exhaust gas feedstream to the coolant. Electric current flow to the thermoelectric heat exchanger 50 is reversed as compared with the first and second operating modes. The reversed direction of the electric current creates a reversed electric potential that promotes a thermal energy transfer from the recirculated exhaust gas feedstream to the coolant. Benefits of cooling the recirculated exhaust gas feedstream are well known in the art and include reducing engine out smoke and NOx emissions during engine operation, and, in diesel applications, boosting low temperature diesel combustion efficiency.

The fourth operating mode (450) includes operating the thermoelectric heat exchanger 50 to generate electric energy by converting thermal energy from the recirculated exhaust gas feedstream into electric energy. The fourth operating mode can be characterized as a default operating mode. For example, the fourth operating mode is executed when no other operating mode is being executed.

The fourth operating mode (450) includes recirculating a portion of the exhaust gas feedstream into the recirculated exhaust gas flow passage 90 and flowing coolant through the coolant flow passage 91. The recirculated exhaust gas is thermally connected to the second side 73 of the thermoelectric semiconductor layer 70 within the thermoelectric heat exchanger 50, and the coolant is thermally connected to the first side 71 of the thermoelectric semiconductor layer 70 within the thermoelectric heat exchanger 50. The temperature differential between the first and second sides 71 and 73 generates an electromotive force resulting in an electric potential. The electric potential creates an electric current that is transferred to the electrical energy storage device 55 for use as electric power. In a hybrid vehicle application, the generated electric power may be used to augment stored electric power or electric power produced by an electric generator.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for managing thermal energy in an internal combustion engine including an exhaust gas recirculation system and an engine cooling system, the method comprising:
    recirculating a portion of an exhaust gas through the exhaust gas recirculation system that is in thermal communication with a first side of a thermoelectric device;
    flowing an engine coolant into thermal communication with a second side of a thermoelectric device;
    controlling electric current between an electrical energy storage device and the thermoelectric device to transfer thermal energy between the recirculated exhaust gas and the engine coolant;
    monitoring a cooling efficiency of the thermoelectric device;
    controlling the electric current to effect a thermal energy transfer from the engine coolant to the recirculated exhaust gas when the cooling efficiency of the thermoelectric device is less than a predetermined value; and
    controlling the electric current to effect the thermal energy transfer from the engine coolant to the recirculated exhaust gas until the recirculated exhaust gas achieves a predetermined temperature for a predetermined time.

2. The method of claim 1, further comprising:
    controlling the electric current to effect a thermal energy transfer from the engine coolant to the recirculated exhaust gas subsequent to an engine cold-start event.

3. The method of claim 2, comprising supplying the electric current from the electrical energy storage device to the thermoelectric device after a predetermined time period subsequent to the engine cold-start event.

4. The method of claim 2, wherein the engine cold-start event comprises an engine start that occurs subsequent to an engine-off state for a predetermined time period.

5. The method of claim 2, wherein the engine cold-start comprises an engine start that occurs when an engine oil temperature is less than a first predetermined temperature threshold.

6. The method of claim 1, further comprising:
    controlling the electric current to effect the thermal energy transfer from the engine coolant to the recirculated exhaust gas until the cooling efficiency of the thermoelectric device achieves a predetermined value.

7. The method of claim 1, further comprising:
    controlling electric current between the electrical energy storage device and the thermoelectric device to transfer thermal energy between the recirculated exhaust gas and the engine coolant to reduce combustion by-product deposit build-up within the thermoelectric device when the cooling efficiency of the thermoelectric device is less than a predetermined value.

8. The method of claim 1, further comprising:
controlling electric current between the electrical energy storage device and the thermoelectric device to transfer thermal energy between the recirculated exhaust gas and the engine coolant to remove heat from the recirculated exhaust gas.

9. The method of claim 8, wherein the electric current to the thermoelectric device is controlled subsequent to determining that a preferred engine intake air temperature can be achieved by lowering recirculated exhaust gas temperature.

10. A method for managing thermal energy in an internal combustion engine including an exhaust gas recirculation system for recirculating exhaust gas of the engine to an air intake of the engine, the method comprising:
recirculating a portion of an exhaust gas through the exhaust gas recirculation system that is in thermal communication with a first side of a thermoelectric device;
flowing an engine coolant into thermal communication with a second side of a thermoelectric device;
supplying electric current from an electrical energy storage device to the thermoelectric device subsequent to an engine cold-start for a predetermined time period;
supplying electric current from the electrical energy storage device to the thermoelectric device until the recirculated exhaust gas achieves a predetermined temperature for a predetermined time;
supplying electric current from the electrical energy storage device to the thermoelectric device to cool the recirculated exhaust gas subsequent to determining that a preferred engine intake air temperature
monitoring a cooling efficiency of the thermoelectric device;
controlling the electric current to effect a thermal energy transfer from the engine coolant to the recirculated exhaust gas when the cooling efficiency of the thermoelectric device is less than a predetermined value; and
controlling the electric current to effect the thermal energy transfer from the engine coolant to the recirculated exhaust gas until the recirculated exhaust gas achieves a predetermined temperature for a predetermined time; can be achieved by lowering recirculated exhaust gas temperature; and
converting thermal energy of the recirculated exhaust gas into electric energy.

11. The method of claim 10, further comprising:
storing the electric energy in an electrical energy storage device.

12. A system for managing thermal energy in an internal combustion engine, comprising:
an exhaust gas recirculation system including a exhaust gas recirculation valve for recirculating an engine exhaust gas into an engine intake air system;
an engine cooling system circulating engine coolant;
a thermoelectric heat exchanger including a thermoelectric device having a first side in thermal communication with the recirculated engine exhaust gas and a second side in thermal communication with the engine coolant;
an electrical energy storage device;
an energy control unit electrically coupled to the thermoelectric device; and to the electrical energy storage device for controlling electrical energy transfer therebetween;
a control module electrically coupled to the exhaust gas recirculation valve and to the energy control unit, the control module controlling recirculation of the engine exhaust gas and controlling the energy transfer between the electrical energy storage device and the thermoelectric device, including the control module configured to execute the following steps:
monitoring a cooling efficiency of the thermoelectric device;
controlling the energy transfer from the engine coolant to the recirculated exhaust as when the cooling efficiency of the thermoelectric device is less than a predetermined value; and
controlling the energy transfer from the engine coolant to the recirculated exhaust as until the recirculated exhaust gas achieves a predetermined temperature for a predetermined time.

13. The system of claim 12 wherein the control module controls the energy transfer from the energy storage device to the thermoelectric device.

14. The system of claim 12 wherein the control module controls the energy transfer from the thermoelectric device to the energy storage device.

15. The system of claim 13 wherein the control module controls the energy transfer from the energy storage device to the thermoelectric device to provide heat to the recirculated engine exhaust gas when the intake air temperature is less than a first predetermined temperature.

16. The system of claim 13 wherein the control module controls the energy transfer from the energy storage device to the thermoelectric device to remove heat from the recirculated engine exhaust gas.

17. The system of claim 12 wherein the control module controls the energy transfer from the energy storage device to the thermoelectric device with current flowing in a first direction to provide heat into the recirculated engine exhaust gas and with current flowing in a second direction to remove heat from the recirculated engine exhaust gas.

* * * * *